July 3, 1956     D. A. McCAULAY ET AL     2,753,386
RECOVERY OF ETHYLXYLENE BY EXTRACTION WITH HF-BF₃
Filed Feb. 2, 1953
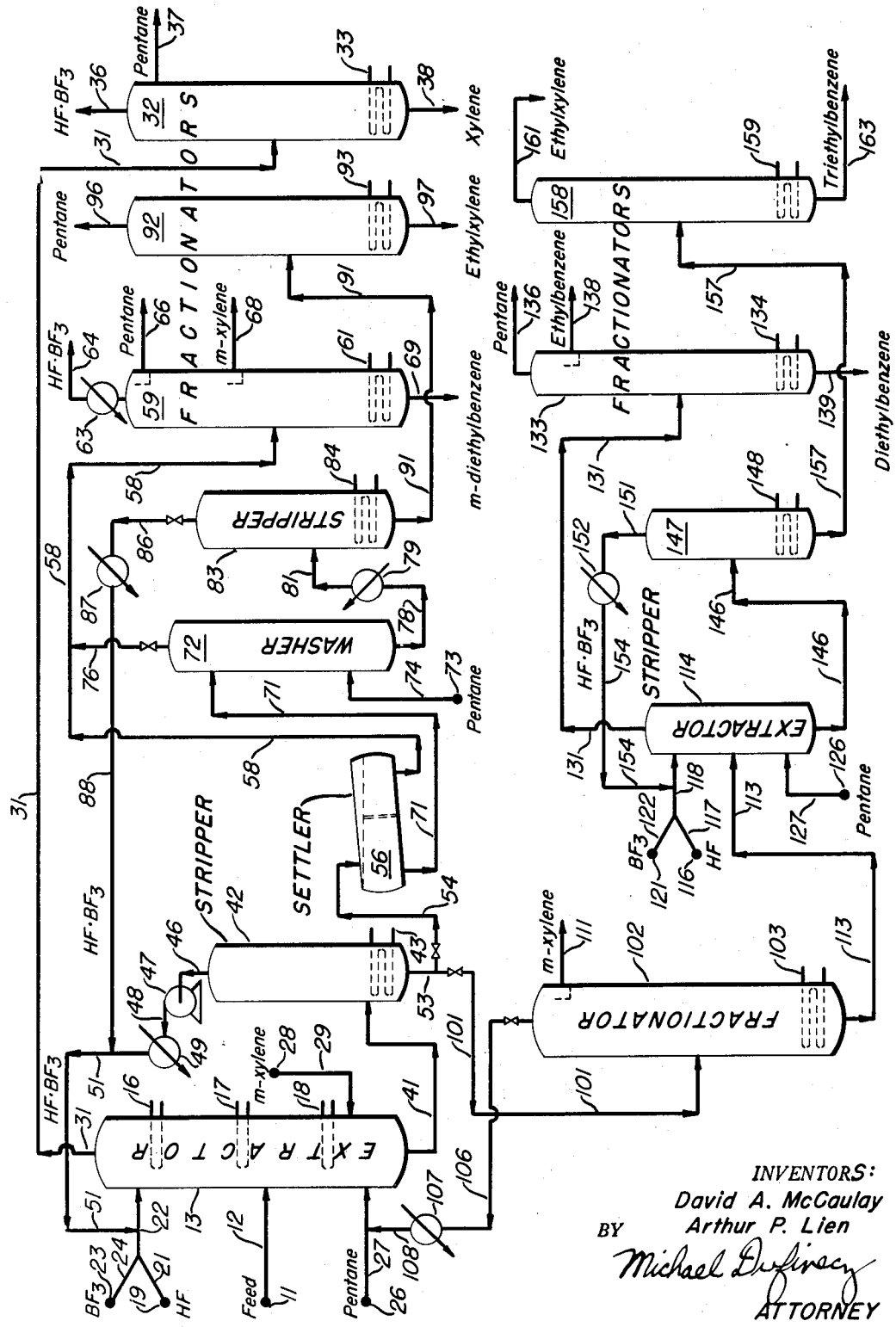
INVENTORS:
David A. McCaulay
Arthur P. Lien
BY
Michael Dufinsey
ATTORNEY United States Patent Office 2,753,386
Patented July 3, 1956

2,753,386

RECOVERY OF ETHYLXYLENE BY EXTRACTION WITH HF-BF₃

David A. McCaulay, Chicago, Ill., and Arthur P. Lien, Highland, Ind., assignors to Standard Oil Company, Chicago, Ill., a corporation of Indiana Application February 2, 1953, Serial No. 334,614

6 Claims. (Cl. 260—674)

This invention relates to the separation of $C_{10}$ alkylbenzene hydrocarbons. Particularly, the invention relates to the separation of diethylbenzene from 1-ethyl 3,5-dimethylbenzene. Still more particularly, the invention relates to a combination process for the treatment of a feed containing xylenes and ethylbenzene to recover high purity m-xylene, diethylbenzene and ethylxylene.

In the treatment of a feed containing xylene isomers as substantially the only polyalkylbenzenes and ethylbenzene with liquid HF-BF₃ agent to effect a physical separation of the $C_8$ aromatic hydrocarbons into an m-xylene-rich fraction and a p- and/or o-xylene-ethylbenzene-rich fraction, some of the ethylbenzene reacts to form a mixture of m-diethylbenzene and 1-ethyl 3,5-dimethylbenzene. These latter $C_{10}$ alkylbenzenes cannot be resolved readily by distillation. The ethylxylene cannot be used as a source of vinylxylene because the divinylbenzene by-product prevents the formation of a polymer of satisfactory characteristics because the divinylbenzene acts as a cross-linking agent; therefore, the mixture of diethylbenzene and ethylxylene is suitable chiefly as a solvent naphtha and as a constituent of gasoline.

An object of this invention is the separation of diethylbenzene from 1-ethyl 3,5-dimethylbenzene, i. e., 1,3,5-ethylxylene. Another object is the treatment of a mixture of $C_{10}$ alkylbenzenes to produce a high purity 1,3,5-ethylxylene. Yet another object is the treatment of a mixture of diethylbenzene and 1,3,5-ethylxylene to produce a 1,3,5-ethylxylene fraction of purity suitable for polyvinylxylene manufacture, i. e., having about 0.5% or less diethylbenzene contaminant. A specific object of the invention is a combination process for the treatment of a feed containing a mixture of $C_8$ aromatic hydrocarbons as substantially the only aromatic hydrocarbons therein with a liquid HF-BF₃ agent to produce a high purity m-xylene fraction, a p- and/or o-xylene-ethylbenzene fraction substantially free of m-xylene, a high purity m-diethylbenzene fraction and an essentially pure 1,3,5-ethylxylene fraction. Other objects will become apparent in the detailed description of the invention.

It has been found that a mixture of diethylbenzene isomers and 1,3,5-ethylxylene can be resolved into a diethylbenzene-enriched fraction and a 1,3,5-ethylxylene-enriched fraction by contacting the mixture with an effective amount of boron trifluoride and sufficient substantially anhydrous liquid hydrogen fluoride to form a separate liquid HF-rich phase. The liquid HF-rich phase, i. e., extract phase, contains a higher proportion of 1,3,5-ethylxylene than did the feed mixture and the raffinate phase attains a higher proportion of diethylbenzene than the feed mixture.

By the use of a countercurrent process and 1 mol of BF₃ per mol of ethylxylene in the feed along with sufficient liquid HF to form a separate extract phase, it is possible to recover from said extract phase essentially pure polymer grade 1-ethyl 3,5-dimethylbenzene, i. e., a product containing in addition to the symmetrical ethylxylene, about 0.5% or less of diethylbenzene.

It is known that polyalkylbenzenes form a complex with BF₃, which complex contains 1 mol of BF₃ and 1 mol of polyalkylbenzene. In addition to these components the complex is believed to contain 1 mol of HF. Generally these complexes are stable only when dissolved in substantially anhydrous liquid HF. It is also known that a mixture of o- and/or p-xylene and m-xylene can be separated by contacting the mixture with liquid HF-BF₃ agent to obtain an m-xylene-enriched fraction and an o- and/or p-xylene-enriched fraction.

It has been discovered that a mixture of diethylbenzene isomers and 1-ethyl 3,5-dimethylbenzene (1,3,5-ethylxylene) can be very readily separated into a fraction that is essentially diethylbenzene-free and a fraction that is substantially 1,3,5-ethylxylene-free. By varying the amount of BF₃ present in the contacting zone it is possible to produce fractions of various diethylbenzene-ethylxylene content.

The liquid HF used in the process of this invention must be substantially anhydrous, i. e., the liquid HF should contain not more than about 2 or 3 weight percent of water.

The amount of liquid HF used in the process must be at least enough to form a separate acid phase (extract phase); that is, the amount of liquid HF must be at least enough to participate in the complex formation and also to exceed the solubility of the liquid HF in the hydrocarbon feed. More than this minimum amount of liquid HF should be used, e. g., about 5 mols of liquid HF per mol of aromatic hydrocarbons in the feed. As many as 50 or more mols of liquid HF may be used. It is preferred to use between about 10 and 30 mols of liquid HF per mol of polyalkyl aromatic in the feed to the diethylbenzene-ethylxylene separation process.

When operating the process in a batchwise manner, addition of BF₃ to the contacting zone, along with liquid HF, results in an extract phase which contains liquid HF, BF₃, ethylxylene and possibly triethylbenzene and ethylbenzene. When sufficient BF₃ is present the extract phase will also contain diethylbenzene. Amounts of BF₃ up to 1 mol per mol of 1,3,5-ethylxylene in a feed consisting essentially of $C_{10}$ alkylbenzene hydrocarbons will result in an extract phase containing substantially no diethylbenzene. The presence of BF₃ in an amount in excess of 1 mol per mol of ethylxylene will result in an extract phase containing ethylxylene and diethylbenzene. When it is desired to produce ethylxylene as the essentially pure product the maximum amount of BF₃ present in the contacting zone must be about 1 mol per mol of 1,3,5-ethylxylene present in the feed; it is preferred to operate with between about 0.9 and 1.1 mols of BF₃ per mol of 1,3,5-ethylxylene in the feed.

By the use of a continuous countercurrent operation it is possible to produce a raffinate phase essentially free of 1,3,5-ethylxylene and an extract phase essentially free of diethylbenzene. The term "essentially free" is intended to mean a fraction containing 0.5 volume percent or less of the undesired compound.

Contacting a feed consisting essentially of diethylbenzene and 1,3,5-ethylxylene as the aromatic hydrocarbon members thereof with liquid HF-BF₃ agent results not only in the separation of the diethylbenzene and 1,3,5-ethylxylene, but also in some disproportionation of the diethylbenzene to ethylbenzene and triethylbenzene. The triethylbenzene appears mainly in the extract phase. The disproportionation of the diethylbenzene proceeds quite rapidly at ordinary temperatures. At a temperature of about 50° C. not only does disproportionation of the ethylbenzene occur, but also other side reactions occur such as isomerization of the polyalkylbenzenes. These side reactions decrease with decrease in temperature and it is possible to carry out the separation with a relatively slight amount of disproportionation at temperatures on the order of −20° C.

The contacting time between the liquid HF-BF$_3$ agent and the diethylbenzene-1,3,5-ethylxylene feed must be long enough to attain substantial equilibrium distribution of the materials between the extract and raffinate phases. Prolonged contacting times have an adverse effect on the product distribution in that undesired side reactions such as disproportionation of the diethylbenzene and isomerization result. It is particularly desirable to use short contact times when operating at temperatures in excess of about 35° C. When operating at the preferred temperature range of between about +10 and +30° C. suitable contacting times are between about 5 minutes and 2 hours, wherein the longer times correspond to the lower temperatures.

The separation process is facilitated by the presence of an HF-insoluble hydrocarbon inert to the action of liquid HF and BF$_3$ under operating conditions. Hereafter this material will be referred to as a diluent. The presence of a diluent not only improves phase separation but also improves the purity of the extract phase. The presence of complex in liquid HF markedly increases the ability of the liquid HF to dissolve aromatic hydrocarbons. The diluent overcomes this tendency apparently by washing out of the liquid HF the physically dissolved aromatic hydrocarbons. However, the presence of very large amounts of diluent has an adverse effect on the separation; apparently the diluent removes some of the "complexed aromatic hydrocarbon" from the extract phase and thereby tends to cause dissociation of the complex. Suitable diluents are low-boiling liquid hydrocarbons, such as, propane, butane, pentane, hexane, heptane, etc. In general the amount of diluent may be between about 50 and 200 volume percent, based on diethylbenzene and 1,3,5-ethylxylene feed.

The presence of benzene, toluene and xylene in the feed is undesirable. The liquid HF-BF$_3$ agent promotes reaction between the diethylbenzene and these other aromatic hydrocarbons to form ethylbenzene and/or ethyltoluene and/or ethylxylene. Thus the yield of diethylbenzene may be markedly reduced owing to the presence of reactive aromatic hydrocarbons such as benzene, toluene, and xylene in the feed to the contacting zone. When 1,3,5-ethylxylene is the only desired product the presence of reactive aromatic hydrocarbons can be tolerated as long as the products of the reaction with diethylbenzene do not interfere with the recovery of an essentially pure 1,3,5-ethylxylene fraction by distillation of the hydrocarbons recovered from the extract phase.

The feed to the process may be a mixture of ethylbenzene isomers and 1,3,5-ethylxylene. However, small amounts of the other ethylxylene isomers are tolerable particularly when operating in a continuous countercurrent manner. The feed may contain, in addition to the diethylbenzene and 1,3,5-ethylxylene, diluent-type hydrocarbons such as would be naturally present in a close-boiling hydrocarbon mixture derived from petroleum or a petroleum conversion process, e. g., a hydroformate fraction; or the feed may be derived from the liquid products of the coking of coal or hydrogenation of coal. It is preferred to use as the feed to the process a mixture of m-diethylbenzene and 1,3,5-ethylxylene derived from the treatment of a mixture of xylene and ethylbenzene with liquid HF-BF$_3$ agent as for example in the separation of m-xylene from a naturally occurring C$_8$ aromatic hydrocarbon mixture by the use of the liquid HF-BF$_3$ agent.

The presence of olefinic compounds, phenolic compounds and organic sulfur compounds is undesirable. The olefins alkylate the aromatic hydrocarbons in the presence of liquid HF-BF$_3$ agent thereby decreasing the yield of desired aromatic hydrocarbons. The phenolic compounds and organic sulfur compounds react with the liquid HF-BF$_3$ agent to form very stable complexes which interfere with the recovery of the desired aromatic hydrocarbons as well as introduce complications into the recovery of HF and BF$_3$ from these complexes. The amount of olefins, phenolic compounds and organic sulfur compounds normally present in hydroformate or platformate fractions are tolerable in the feed to this process. However, where feeds contain excessive amounts of these undesirable constituents many processes are known in the art for removing these constituents.

The annexed drawing which is a part of this specification shows an illustrative embodiment of a combination process for the production of high purity m-xylene and essentially pure diethylbenzene and 1,3,5-ethylxylene. It is to be understood that many items of process equipment have been omitted from this schematic diagram. These details may be readily added by one skilled in the art.

In this illustration the feed consisted of the overhead fraction derived from the superfractionation of a hydroformate cut. This cut consisted of 2 volume percent of non-aromatic hydrocarbons; a very slight amount of organic sulfur compounds and olefinic hydrocarbons—the total sulfur content is 0.01%; the remainder of the cut consisted of C$_8$ aromatic hydrocarbons in the following molar percentages based on aromatic hydrocarbon: ethylbenzene, 12; o-xylene, 21; m-xylene, 48; p-xylene, 19; C$_9$ aromatic hydrocarbons, trace. This cut was obtained by extractively distilling, with phenol as the separating agent, a hydroformate fraction boiling between about 270° and 300° F., which fraction had contained about 12% of non-aromatic hydrocarbons.

An o-xylene fraction was removed from this cut by superfractional distillation. The overhead fraction which forms the feed to the illustrative embodiment contained, on a volume percent basis, ethylbenzene, 15; o-xylene, 3; m-xylene, 56; p-xylene, 23; and non-aromatic hydrocarbons, about 3. The feed is passed from source 11 by way of line 12 into extractor 13. Extractor 13 consists of a vertical cylindrical vessel arranged to operate as a countercurrent contacting vessel. Extractor 13 may be filled with HF-resistant packing such as Berl saddles, Raschig rings, etc., or may be equipped with bubble trays. Extractor 13 is of such a size that about six theoretical extraction stages are provided. Extractor 13 is provided with heat exchanger coils 16, 17 and 18 to permit operation at any desired temperature or to permit operation with a temperature gradient over the height of the extractor. In this illustration extractor 13 is operated at about 70° F. (21° C.) and the heat exchanger coils are used to remove the exothermic heat of complex formation.

Substantially anhydrous liquid HF from source 19 is passed by way of line 21 into line 22 where it meets BF$_3$ from source 23 and line 24. The liquid HF-BF$_3$ stream is passed into extractor 13 at a point near the upper end thereof. In this illustration 15 mols of liquid HF per mol of aromatic hydrocarbon in the feed are present in line 22. The amount of BF$_3$ present in line 22 is equal to 1 mol per mol of m-xylene present in extractor 13 and 0.45 mols per mol of ethylbenzene present in the feed.

While the combined HF-BF$_3$ stream is shown as being introduced at one point in extractor 13, it is to be understood that the agent may be introduced at various points along the height of the extractor. Also, the BF$_3$ may be introduced at various points along the height of the extractor separately from the liquid HF.

In order to facilitate phase separation in the extractor and also to decrease the amount of o- and p-xylene and unreacted ethylbenzene present in the extract phase, pentane from source 26 is introduced by way of line 27 into extractor 13 at a point near the base thereof. The amount of pentane used in this embodiment is 150 volume percent based on total feed.

In order to further improve the separation efficiency of the extraction operation an m-xylene reflux from source 28 is introduced by way of line 29 into extractor 13 at a lower point thereof, preferably the reflux is introduced at a point above the point of entry of the pentane diluent. Herein 1 mol of m-xylene reflux is charged to extractor 13 per mol of m-xylene in the feed.

A raffinate phase consisting of pentane, o-xylene, p-xylene, some ethylbenzene (about 20% of the ethylbenzene content of the feed), some slight amount of m-xylene and traces of HF and BF₃ is withdrawn overhead from extractor 13. Raffinate phase is passed by way of line 31 into fractionator 32, which fractionator is provided with a reboiler 33. In fractionator 32, HF and BF₃ are taken overhead through line 36 and are returned by way of lines not shown to line 22 for reuse in the process. Pentane is removed from fractionator 32 through line 37 and is recycled by way of lines not shown to line 27 for reuse in the process. A product "xylene" fraction is withdrawn from the bottom of fractionator 32 and is sent to storage by way of line 38 and other lines not shown.

The extract phase withdrawn from extractor 13 by way of line 41 consists of liquid HF, BF₃, m-xylene, some slight amounts of p-xylene and ethylbenzene, along with diethylbenzene and ethylxylene. Under the conditions of operation in extractor 13 the diethylbenzene is essentially pure m-isomer and the ethylxylene is essentially pure 1,3,5-isomer. The extract phase is passed from line 41 into stripper 42 which is provided with internal heater 43. Stripper 42 is a vertical cylindrical vessel provided with some fractionating capacity near the top thereof. Stripper 42 is operated under vacuum in order to remove HF and BF₃ at as low a temperature as possible and thereby decrease the amount of interaction of diethylbenzene and xylene to produce ethylxylene. Herein stripper 42 is operated at 70° F. (21° C.) under a slight vacuum. HF vapor and BF₃ is withdrawn from stripper 42 by way of line 46, vacuum pump 47, line 48 and heat exchanger 49. In heat exchanger 49 the HF is condensed and a liquid HF-BF₃ mixture is passed by way of line 51 to line 22 for reuse in the process.

The complexes present in the extract phase are not completely decomposed in stripper 42. Enough BF₃ is retained in the acid phase to theoretically complex with the 1,3,5-ethylxylene present therein, i. e., all the BF₃ in excess of this amount is stripped out of the acid phase and removed overhead. When the BF₃ is thus removed two phases appear in the bottom of stripper 42. One phase, called hereafter the second raffinate phase, consists of xylene, diethylbenzene and some 1,3,5-ethylxylene. The acid phase in stripper 42, hereafter called the second extract phase, consists of liquid HF, BF₃, 1,3,5-ethylxylene, and diethylbenzene. The mixture of phases is withdrawn from stripper 42 by way of line 53 and is passed by way of valved line 54 into settler 56. Settler 56 is arranged to effect a separation of the second raffinate phase from the second extract phase. The second raffinate phase is withdrawn from the upper portion of settler 56 by way of line 58 and is introduced into fractionator 59.

Fractionator 59 is provided with an internal heater 61. Fractionator 59 is shown schematically as producing a separation of the constituents present in line 58. Thus entrained HF and BF₃ are taken overhead and condensed in heat exchanger 63 and the HF-BF₃ mixture is then passed by way of line 64 and other lines not shown to line 22 for reuse in the process. Pentane is withdrawn from fractionator 59 by way of line 66 and is recycled by lines not shown for reuse in the process. The m-xylene is withdrawn from fractionator 59 by way of line 68 and is sent to storage and also to line 29 for reuse in the process by way of lines not shown. The product m-diethylbenzene is withdrawn from fractionator 59 by way of line 69 and is sent to storage not shown. This product m-diethylbenzene contains some slight amount of 1,3,5-ethylxylene.

The second extract phase is withdrawn from settler 56 by way of line 71 and is passed into washer 72. Washer 72 is a vertical cylindrical vessel equipped with packing to provide countercurrent contacting. Pentane from source 73 is passed through line 74 into a lower part of washer 72. In this illustration 1 volume of pentane is used per volume of hydrocarbons present in the second extract phase. A pentane-rich phase is withdrawn from the top of washer 72 through line 76 and is introduced into line 58. The pentane-rich phase contains pentane, some m-xylene, some ethylbenzene and some m-diethylbenzene which had been physically dissolved in the liquid HF.

The washed second extract phase is removed from washer 72 through line 78 and is passed by way of heat exchanger 79 and line 81 into stripper 83. Stripper 83 is similar in construction to stripper 42 and is provided with internal heater 84. Stripper 83 is operated at a temperature high enough to decompose the complex and remove all HF, BF₃ and some of the pentane overhead. A suitable temperature is about 100° F. (38° C.). The HF, BF₃ and pentane are passed through valved line 86 into heat exchanger 87 where the pentane and HF are condensed. The HF-BF₃-pentane stream is passed by way of lines 88 and 51 to line 22 for reuse in the process.

The bottoms from stripper 83 are passed by way of line 91 into fractionator 92 which is provided with internal heater 93. In fractionator 92 residual pentane is removed overhead through line 96 and is recycled for reuse in the process. From the bottom of fractionator 92 a substantially pure 1,3,5-ethylxylene fraction is removed and is passed to storage not shown by way of line 97. This ethylxylene product contains on the order of 0.5 volume percent of m-diethylbenzene.

The method of operation described above produces substantially pure 1,3,5-ethylxylene at the expense of some loss of ethylxylene to the m-diethylbenzene product. This loss can be avoided and a simultaneously higher purity ethylxylene product can be obtained by adding liquid HF-BF₃ near the top of washer 72 and adding a reflux of 1,3,5-ethylxylene near the bottom of washer 72. The amount of BF₃ added must be 1 mol per mol of reflux added.

When it is desired to maximize the recovery of 1,3,5-ethylxylene the following alternative method of operation is preferred. In this preferred embodiment stripper 42 is operated under vacuum to remove all the HF and BF₃ overhead, leaving behind the aromatic hydrocarbons and some pentane. The valve in line 54 is closed and all of the aromatic hydrocarbons from the bottom of stripper 42 are passed through line 53 and valved line 101 into fractionator 102. This fractionator is provided with an internal heater 103. Pentane vapors are taken overhead through valved line 106; these are condensed in heat exchanger 107 and the liquid pentane is passed through line 108 into line 27 where it is reused in the operation in extractor 13.

An m-xylene fraction containing some slight amount of o- and p-xylene is withdrawn from fractionator 102 by way of line 111 and is sent to storage not shown; a part of this stream is recycled to line 29 for use as reflux in extractor 13.

The bottoms fraction from fractionator 102 is passed through line 113 into extractor 114. Extractor 114 is similar in construction to extractor 13. Liquid HF from source 116 is passed through line 117 to line 118. BF₃ from source 121 is passed through line 122 to line 118. The combined stream in line 118 is introduced into an upper portion of extractor 114. Herein 12 mols of liquid HF are introduced per mol of 1,3,5-ethylxylene present in extractor 114. The amount of BF₃ introduced into extractor 114 is 1 mol per mol of 1,3,5-ethylxylene present in extractor 114.

Pentane from source 126 is passed through line 127 into a lower portion of extractor 114. Herein 100 volume percent of pentane is used, based on aromatic hydrocarbons introduced into extractor 114.

In this illustration extractor 114 is operated at 60° F.

(15° C.) in order to reduce the amount of disproportionation of diethylbenzene, and a contacting time of about 10 minutes is provided in each of the two theoretical extraction stages present in extractor 114.

The pentane-rich phase is withdrawn from the top of extractor 114 and is passed by way of line 131 into fractionator 133 which is provided with internal heater 134. Fractionator 133 shows schematically the withdrawal of pentane overhead through line 136. This pentane contains some HF and BF₃ and is recycled for use in the process. Ethylbenzene resulting from the disproportionation of diethylbenzene is withdrawn through line 138 and is sent to storage not shown. This ethylbenzene fraction is essentially C. P. quality. The product m-diethylbenzene is withdrawn from fractionator 133 by way of line 139 and is sent to storage not shown. This product m-diethylbenzene contains less than 0.5 volume percent of 1,3,5-ethylxylene.

The extract phase in extractor 114 is withdrawn from the bottom thereof and is passed by way of line 146 into stripper 147. Stripper 147 is provided with an internal heater 148. Stripper 147 is similar in construction to strippers 42 and 83. Herein stripper 147 is operated to take overhead HF, BF₃ and pentane. A suitable temperature is 125° F. (52° C.). The overhead fraction is passed through line 151 into heat exchanger 152. The condensed HF-pentane-BF₃ mixture is passed through line 154 to line 118 for reuse in the operation in extractor 114.

The bottoms in stripper 147 are withdrawn by way of line 157 and passed into fractionator 158 which is provided with internal heater 159. An overhead fraction of 1,3,5-ethylxylene is withdrawn by way of line 161 and is passed to storage not shown. This ethylxylene fraction contains less than 0.5 volume percent of diethylbenzene. A bottoms fraction consisting of essentially pure triethylbenzene is withdrawn from fractionator 158 by way of line 163 and is passed to storage not shown.

Gradually gaseous impurities such as H₂S and hydrocarbon gases will build up in the BF₃ system. Periodically BF₃ will have to be withdrawn and passed through a purification zone not shown to remove these contaminants.

In order to show the results obtainable by this process in a single-stage batchwise operation the following experimental run is described.

This run was carried out in a carbon steel reactor provided with a 1725 R. P. M. stirrer. In this run the liquid feed consisting of m-diethylbenzene, 1,3,5-ethylxylene and n-heptane was added to the reactor. Then the liquid HF was charged into the reactor and finally BF₃ from a cylinder was charged into the reactor. The charge to the reactor consisted of:

|  | ml. | Mols |
|---|---|---|
| m-Diethylbenzene | 100 | 0.65 |
| 1,3,5-Ethylxylene | 100 | 0.63 |
| n-Heptane | 200 |  |
| HF (0.5% water) | 400 | 20 |
| BF₃ |  | 0.69 |

The contents of the reactor were maintained at 18° C. and agitated for 60 minutes. At the end of this time the contents of the reactor were settled for 10 minutes. Two liquid phases were found to be present in the reactor and each phase was withdrawn into a separate receiver. Each liquid phase was withdrawn into a vessel filled with crushed ice. Decomposition of the complexes by the water resulted in the formation of a lower aqueous layer and an upper hydrocarbon layer. The hydrocarbon layer was washed with dilute aqueous ammonia to remove HF and BF₃ and was then water washed to remove traces of the aqueous ammonia.

The raffinate and extract hydrocarbons were fractionated in a laboratory column providing about 30 theoretical plates. The various cuts were analyzed by a combination of specific gravity, boiling point, refractive index and infrared techniques. The product distribution of the aromatic constituents of the raffinate and extract phases were:

| Product Distribution, Mols | Raffinate | Extract | Total |
|---|---|---|---|
| Ethylbenzene | 0.09 | .04 | .13 |
| Diethylbenzene | 0.41 | .00 | .41 |
| 1,3,5-Ethylxylene | 0.07 | .57 | .64 |
| Triethylbenzene | 0.03 | .08 | .11 |
| Total | 0.60 | .69 | 1.29 |

The analyses showed that the diethylbenzene fraction was essentially the m-isomer and the ethylxylene was essentially the 1,3,5-isomer.

This run shows that it is possible in one single batch stage, using 1.1 mols of BF₃ per mol of 1,3,5-ethylxylene present in the feed, to produce an extract phase containing 1,3,5-ethylxylene as the only detectable C₁₀ alkylbenzene. By operating for a shorter contacting time the amount of diethylbenzene disproportionated to triethylbenzene would be substantially reduced. Furthermore, by operating in a continuous countercurrent manner, it is possible to overcome the loss of 1,3,5-ethylxylene to the raffinate phase.

We claim:

1. A method of separating 1,3,5-ethylxylene from meta-diethylbenzenes, which method comprises contacting under substantially anhydrous conditions a feed containing meta-diethylbenzene and 1,3,5-ethylxylene as substantially the only aromatic hydrocarbon constituents with an agent containing not more than about 1 mol of BF₃ per mol of 1,3,5-ethylxylene in said feed and at least sufficient liquid HF to form separate extract and raffinate phases, at a temperature below about +50° C. for a time at least sufficient to substantially attain separation equilibrium between said phases, separating said phases and recovering from said extract phase an essentially pure 1,3,5-ethylxylene fraction.

2. The method of claim 1 wherein said liquid HF is present in an amount between about 5 and 50 mols per mol of aromatic hydrocarbon in said feed.

3. The method of claim 1 wherein said BF₃ is present in an amount between about 0.9 and 1.1 mols per mol of 1,3,5-ethylxylene in said feed.

4. The method of claim 1 wherein said contacting is carried out at a temperature between about +10 and +30° C. for a time between about 5 minutes and 2 hours, wherein the longer time corresponds to the lower temperature.

5. The method of claim 1 wherein said contacting is carried out in the presence of an essentially non-reactive essentially inert to the action of liquid HF and BF₃ hydrocarbon diluent in an amount between about 50 and 200 volume percent based on aromatic hydrocarbon constituents in said feed.

6. A combination process which comprises contacting under substantially anhydrous conditions a feed containing ethylbenzene, m-xylene and at least one other xylene isomer as substantially the only aromatic constituents with an agent consisting of not more than about 1 mol of BF₃ per mol of m-xylene and not more than about 0.5 mols of BF₃ per mol of ethylbenzene and at least enough liquid HF to form distinct raffinate and extract phases at a temperature below about 30° C. for a time sufficient to substantially attain separation equilibrium between said phases, separating an extract phase comprising essentially HF, BF₃, m-xylene, meta-diethylbenzene and 1,3,5-ethylxylene from a raffinate phase, producing a second raffinate phase and a second extract phase which comprises essentially HF, BF₃ and 1,3,5-ethylxylene by removing, under conditions which minimize interaction of xylene and said diethylbenzene, all the BF₃ from said extract phase except about 1 mol of BF₃ per mol of 1,3,5-ethylxylene present in said extract phase, separating said second raffinate phase from said second extract phase, recovering an m-xylene fraction and a meta-diethylbenzene fraction from said second raffinate phase and recovering an essentially pure 1,3,5-ethylxylene fraction from said second extract phase.

References Cited in the file of this patent

UNITED STATES PATENTS

| | | |
|---|---|---|
| 2,528,892 | Lien et al. | Nov. 7, 1950 |
| 2,564,073 | Lien et al. | Aug. 14, 1951 |